United States Patent [19]

Lanfer

[11] Patent Number: 4,598,680
[45] Date of Patent: Jul. 8, 1986

[54] METHOD AND APPARATUS FOR OPTIMIZING A CONTROLLABLE ADJUSTMENT PARAMETER OF A CYCLICALLY OPERATING MACHINE, PARTICULARLY AN INTERNAL COMBUSTION ENGINE

[75] Inventor: Hermann Lanfer, Illigen, Fed. Rep. of Germany

[73] Assignee: Robert Bosch GmbH, Stuttgart, Fed. Rep. of Germany

[21] Appl. No.: 775,124

[22] Filed: Sep. 12, 1985

[30] Foreign Application Priority Data

Sep. 26, 1984 [DE] Fed. Rep. of Germany ....... 3435254

[51] Int. Cl.[4] ................................................. F02P 5/04
[52] U.S. Cl. ..................................... 123/425; 123/501; 123/435
[58] Field of Search .................... 123/425, 435, 501

[56] References Cited

U.S. PATENT DOCUMENTS

| | | | |
|---|---|---|---|
| 3,875,912 | 4/1975 | Bullo | 123/425 |
| 3,957,023 | 5/1976 | Peterson | 123/425 |
| 4,054,111 | 10/1977 | Sand | 123/425 |
| 4,131,097 | 12/1978 | Sawada | 123/425 |
| 4,153,019 | 5/1979 | Laubenstein | 123/425 |
| 4,449,501 | 5/1984 | Greeves | 123/425 |
| 4,455,980 | 6/1984 | Sasayama | 123/425 |

Primary Examiner—Ronald B. Cox
Attorney, Agent, or Firm—Frishauf, Holtz, Goodman & Woodward

[57] ABSTRACT

For optimization of the ignition timing of an internal combustion engine, the crankshaft angle at which the maximum combustion chamber pressure is measured is determined for one or all of the cylinders of the engine, and is used as the report value for comparison with reference value to produce an error signal that is capable of shifting the ignition timing to an optimal value. Optimization is accomplished by modifying the reference value in a manner controlled by the measurement of the work done in each of the cylinders, as computed from a crankshaft angle signal in a combustion chamber pressure signal, the work done signal being multiplied by the error signal before being furnished to an integrating controller that averages the multiplier output with the results obtained for previous cycles of the engine to produce the reference value signal. The multiplication of the work done signal by the error signal makes the jist of the reference value signal proportional to the error signal magnitude. The optimization is stable both quick response to changes in engine load and in long-term changes of engine operating conditions, such as those related to engine temperature.

6 Claims, 7 Drawing Figures

METHOD AND APPARATUS FOR OPTIMIZING A CONTROLLABLE ADJUSTMENT PARAMETER OF A CYCLICALLY OPERATING MACHINE, PARTICULARLY AN INTERNAL COMBUSTION ENGINE

This invention concerns engine optimizing methods and apparatus by reference to an optimality parameter, preferably an energy or force parameter, by obtaining an error signal presenting the difference between a desired and an actual value of an operating parameter of the engine.

SAE paper 66022 entitled "Control System to Optimize Engine Power" of Jan. 10–14, 1966 discloses a method and apparatus of the general kind just mentioned. In that system, the torque developed at the crankshaft of an internal combustion engine is measured and maximized by an automatic adjustment of the ignition timing of the engine. The ignition timing is continuously varied about its current setting, preferably at a frequency between a tenth and a twentieth of the rotary speed of the engine, and compared with the torque changes thereby resulting. According to whether an in-phase or a counter-phase relation is present between ignition timing shift and torque variation, a new ignition timing adjustment is made until the maximum torque is reached. In consequence, however, an increase of operating noise of the engine must be taken into account as a cost of whatever advantages are obtained by this method.

Another known method is based on the premise that combustion with approximately maximum efficiency is always present when the maximum combustion pressure is found at a definite constant crankshaft angle after the upper piston deadpoint in the engine cylinder in which the combustion pressure is measured. Regulation for this involves measuring for each power stroke, the crankshaft angle at which the maximum combustion pressure appears and using that angle as an actual value for comparison with the known invariant crankshaft angle as a desired value. An error signal is thus derived and supplied to an integrating controller for setting the ignition timing. This method, however, does not produce any maximum efficiency when motors are measured which, as the result of manufacturing tolerances or where in operation, have properties deviating from the optimized test motor in which the definite invariant crankshaft angle in question was measured.

SUMMARY OF THE INVENTION

It is an object of the present invention to provide a method and apparatus for optimizing the seting of a control of a cyclically operating machine, particularly the ignition timing of an internal combustion engine, so that an optimal efficiency adjustment of the machine is automatically set without the need of obtaining beforehand information regarding special crankshaft angles or other predetermined optimization data for the machine, and to do so without increase of machine noise or irregularity and without requiring time consuming recalculation of desired values. It is also important that the control be fast acting and useful for machines of high dynamic output.

Briefly, a controllable adjustment parameter, typically the ingition timing crankshaft angle of an internal combustion engine is controlled by comparison of a desired value with an actual value and the error signal is multiplied by the value of an optimality parameter, typically the power developed in a combustion stroke, to produce a correlation parameter signal for each cycle of the engine, which is then averaged with past values of the same obtained in a predetermined number of previous cycles of operation. The desired value of the adjustment parameter, thus the ignition timing angle in the case of an internal combustion engine, is then shifted in the direction having the higher probability of producing a zero value of the average correlation signal, except, of course, when the change of the desired value in either direction would have equal proability of reducing the average correlation signal. It is particularly advantageous for the extent of shift of the desired value to be proportional to the most recent valid average value, since in that way a rapid and precise convergence to the optimum desired value is obtained. For carrying out this method in an ignition timing system for an internal combustion engine, it is particularly useful to measure the work done during the combustion stroke in the engine by integration of the combustion chamber pressure in an integrator in order to utilize this work quantity as the optimality parameter. The forming the new desired value is particularly simple when between two combustion cycles the measured work is multiplied by the last error signal value and supplied to an integrating controller. This requires relatively few functional stages and storage components, such as involve increased hardware expense in analog electronic circuits or increased programming expense in microcomputer digital circuits or require relatively long time periods for carrying out their functions.

It is to be understood that the invention is not limited to the illustrated example described below. It can be applied wherever adjustment parameters of a cyclically operating machine are desired to be set at optimal adjustments of the machine, for example for regulating the composition of engine exhaust gas by control of fuel injection to minimize noxious effects of the exhaust gas composition, or energy development of a turbine by adjusting the turbine blade angle, etc. It is furthermore within the scope of the invention to utilize the process of the invention in a portion of a more elaborate control system.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
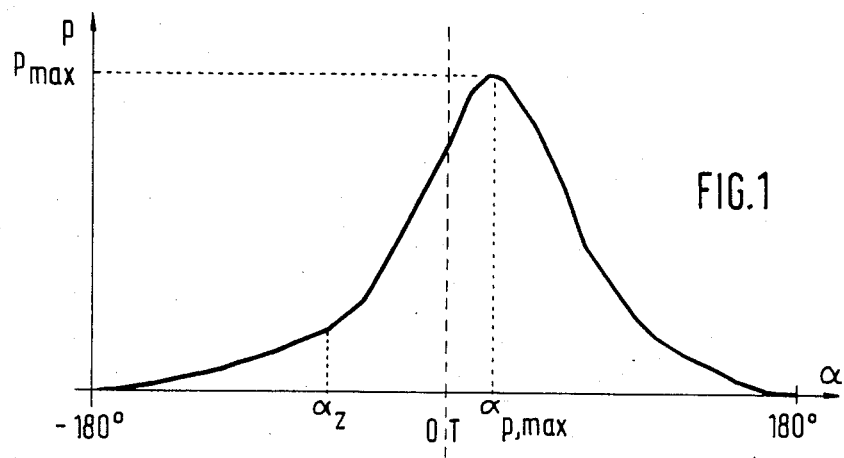
FIG. 1 is a graph in which combustion chamber pressure is plotted against the crankshaft angle.

FIG. 1 shows the course of the pressure p in a cylinder of an internal combustion engine plotted against crankshaft angle $\alpha$ for a revolution of the crankshaft during which a power stroke takes place. The upper deadpoint OT is designated by the intersection of a broken vertical line crossing the horizontal axes of the graphs of FIGS. 1 and 2 and this represents a zero value of the angle $\alpha$ at the lower deadpoint that the left extremity of the graph where $\alpha = -180°$. The piston of the cylinder in question is moved upward from its lower deadpoint to its upper deadpoint in a compression stroke during which pressure rises. Near the end of this compression stroke, at the angle $\alpha_z$, ignition takes place with the beginning of combustion in the cylinder. The pressure in the combustion chamber of the cylinder rises even after the piston starts moving downward at the upper deadpoint OT, until a maximum pressure $p_{max}$ is reached at a crankshaft angle $\alpha_{p,max}$. The pressure then falls with the expansion of the burned gases while the piston moves downward until the crankshaft $\alpha$ reaches 180°. In a four-stroke internal combustion engine, the exhaust stroke then follows, and after that the intake stroke. These last two strokes are not shown for simplification of the diagram.

Figure 2:
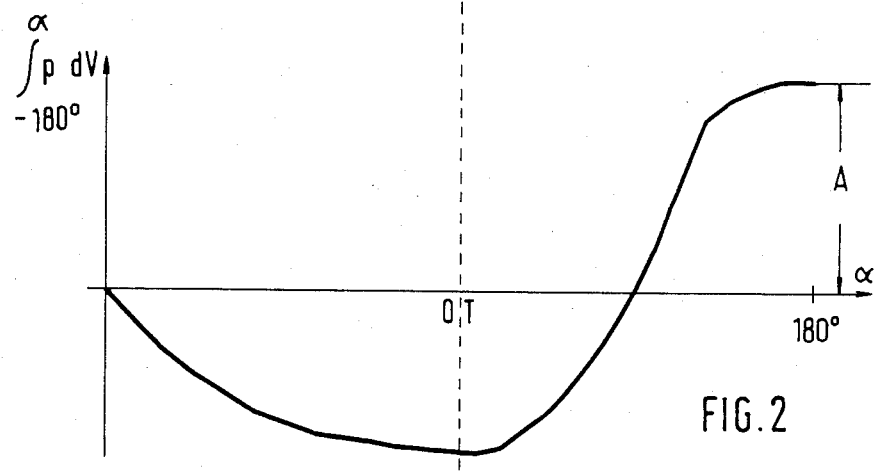
FIG. 2 is a graph of the work performed in an engine cylinder between an initial crankshaft position and a later crankshaft angle.

FIG. 2 is drawn so that the same horizontal scale of the angle $\alpha$ is provided as in FIG. 1. In FIG. 2, however, the ordinate, the integral of the work done, considered as the integral of the pressure over the cylinder volume integrated beginning with the lower deadpoint and ending at the particular angle $\alpha$ shown on the Abscissa. During the compressing of the gas in the cylinder until the upper deadpoint is reached, energy is consumed, so that the work done must be given a negative sign. After the upper deadpoint is passed, the expansion of the gas in the cylinder takes place, while a higher pressure is present during combustion than during compression. Accordingly, at the end of the combustion stroke, an energy gain A is reached. For practical measurement of the energy output A during a function cycle of the internal combustion engine, the pressure is not integrated over the volume, but is integrated, with a substitution, over the crankshaft angle $\alpha$. The substitution factor (dependence of the volume on crankshaft angle) is measured for a particular motor beforehand and stored so that a corresponding table can be provided in a read-only memory (ROM) for each engine of the particular type, since it is not necessary to measure each motor of the same type individually.

Figure 3:
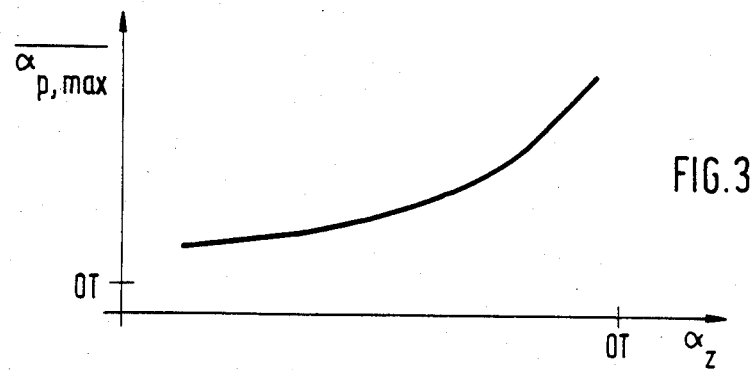
FIG. 3 is a graph of the value of crankshaft angle of maximum combustion chamber plotted against the ignition timing angle.
Figure 4:
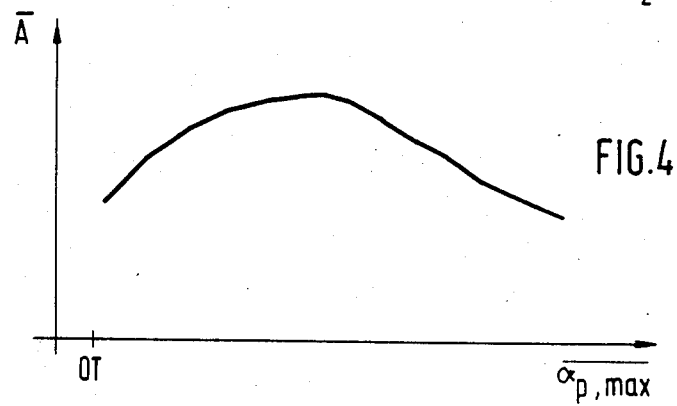
FIG. 4 is a graph in which an averaged value of the work quantity A of FIG. 2 is plotted against the crankshaft angle for maximum combustion chamber pressure.

FIGS. 3 and 4 describe the statitical behavior of the engine for constant ignition angle. FIG. 3 shows the statistical average value $\alpha_{p,\,max}$ for the crankshaft angle of maximum combustion chamber pressure for a constant setting of the ignition angle plotted as a function of an ignition angle. The function rises monitonically for negative ignition angles, namely for ignition at instants before the upper deadpoint is reached. FIG. 4 shows the dependence of the average mechanical energy $\overline{A}$ developed with respect to the average value of crankshaft angle at which the maximum combustion chamber pressure $\overline{\alpha_{p,max}}$ is found. This function is convex, i.e., it has a definite maximum at a particular crankshaft angle of maximum combustion chamber pressure. It is clearly recognizable from comparison of FIG. 3 with FIG. 4 that by setting of an average ignition angle $\alpha_z$ the maximum of average developed mechanical energy can be obtained.

Figure 5:
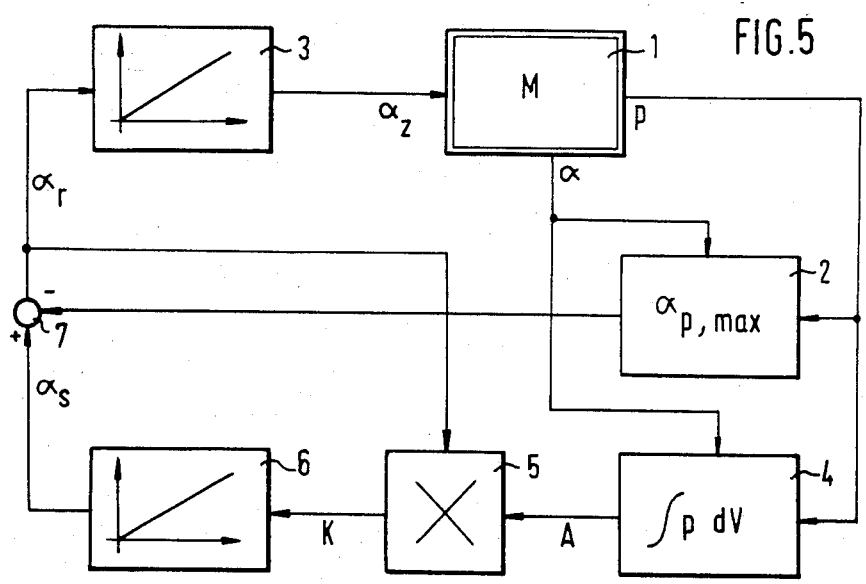
FIG. 5 is a circuit block diagram of a control system for performing the method of the invention.

FIG. 5 shows the diagram of a control system connected to an internal combustion engine 1 for optimally setting the ignition angle $\alpha_z$ which is the adjustment parameter in this case. It is intended to make this adjustment so that the work developed in the engine 1 should be at a maximum. For simplification of the drawing, the presence of a pressure sensor for measuring the combustion chamber pressure p and of a crankshaft angle sensor for measuring the crankshaft angle $\alpha$, is indicated in the drawing merely by output connections designated p and $\alpha$ respectively, going out from the engine to other components 2 and 4. The component 2 is a stage for forming, from the signals provided by the sensors just mentioned, a signal corresponding to the crankshaft angle of maximum combustion chamber pressure $\alpha_{p,\,max}$, which is the actual value of the optimality parameter which is to be used in a control loop for an ignition timing control 3, at the output of which the signal determining the ignition timing angle $\overline{\alpha_z}$ is produced for the engine. A work measurement stage 4 produces from the sensor signals above-mentioned, a work quantity signal A by integration.

The error signal supplied to the ignition timing controller 3 is also multiplied by the measured value of the work A in a multiplier 5 to produce an input magnitude K (correlation parameter) for a desired value controller 6. The output of t the desired valued controller 6 is a desired angle value $\alpha_s$ which is furnished to the non-inverting input of a difference forming circuit 7 to which the actual value $\alpha_{p,max}$ is supplied to produce the error signal $\alpha_r$ for "correcting" the output timing signal of the ignition timing controller 3.

Figure 6:
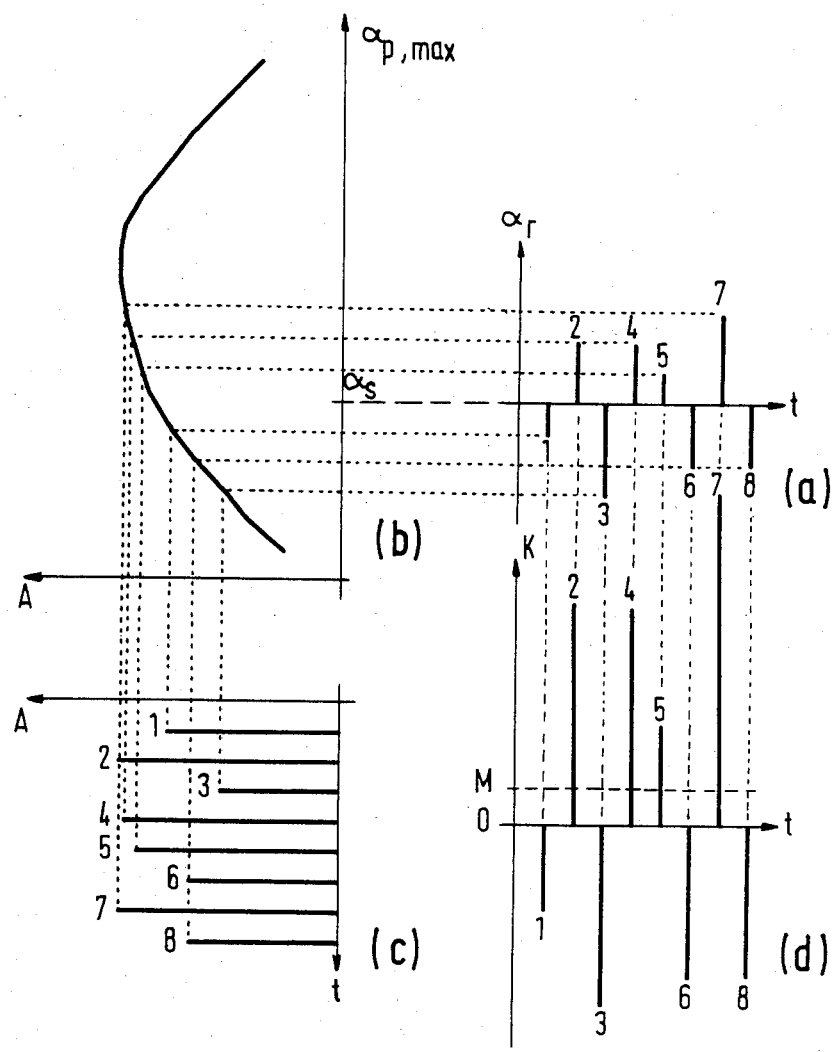
FIG. 6 is a functional diagram in the nature of a graph for explanation of the method of operation of the control system of FIG. 5.

FIG. 6 shows the behavior of the control system of FIG. 5 for a steady-state operating condition, i.e., during an interval of observation in which the desired value $\alpha_s$ is unchanged.

Part (a) of FIG. 6 shows the values of the error signal $\alpha_r$ for eight combustion cycles. Part (c) of FIG. 6 similarly shows the values of the work quantity A obtained for the same eight combustion cycles at the output of the work value measurement stage 4. For understanding the relation between these two sets of values, there is shown in part (b) of FIG. 6 the curve (corresponding to FIG. 4) showing the relation of the work performed plotted against the crankshaft angle for maximum cylinder pressure $\alpha_{p,max}$. This relation holds for steady-state operation at constant ignition angle. Since in steady-state operation the desired value $\alpha_s$ is unchangeable, and the error signal $\alpha_r$ is not itself averaged, the respective values of the work A are to be found by reflecting the values of the error signal $\alpha_r$ about the steady-state desired value $\alpha_s$ at the characteristic curve shown in part (b) of FIG. 6. For each combustion cycle, the value of the measured work A is multiplied in the multiplier 5 by the applicable error signal $\alpha_r$, thus producing the output values K of the multiplier 5 for the eight combustion cycles shown in part (d) of FIG. 6.

A horizontal broken line M in part (d) of FIG. 6 shows an average value of the output values K of the multiplier. Since these output values K operate on the desired value controller 6 which has integrating behavior, the desired value $\alpha_s$ will change at the output of the desired value controller 6 and will do this in the direction towards larger ignition angle, so that a desired value shift for producing higher developed mechanical work is obtained.

Figure 7:
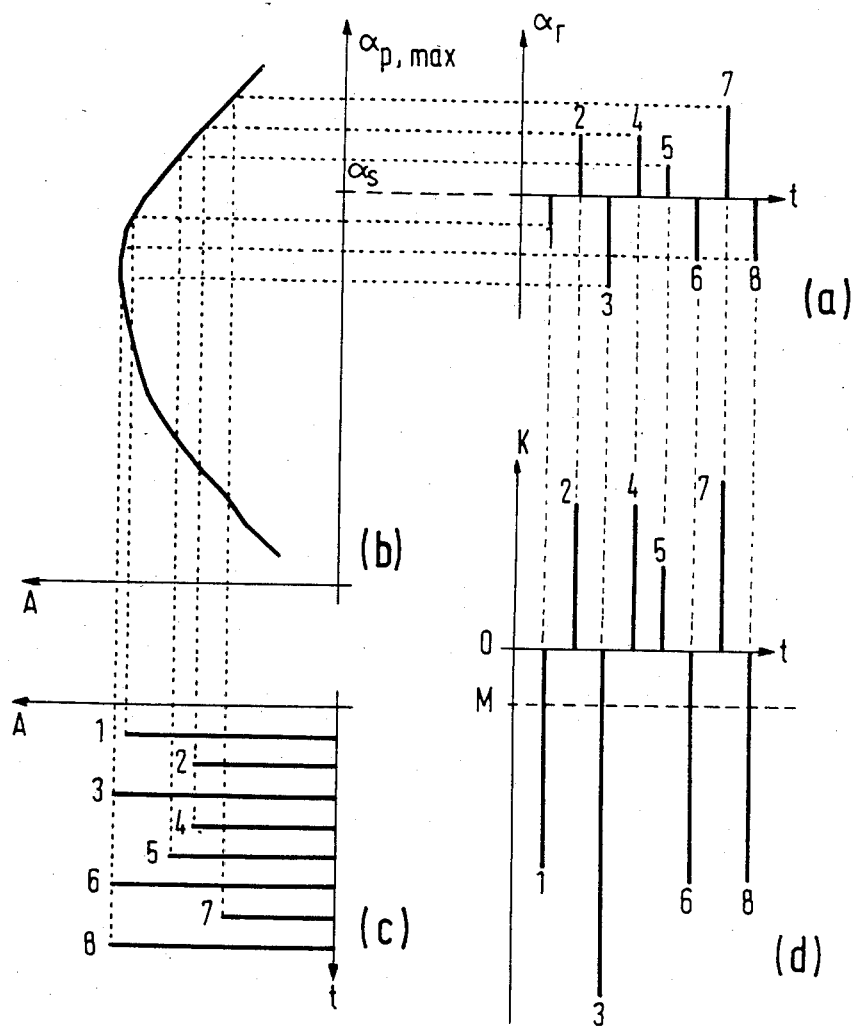
FIG. 7 is another diagram in the nature of a graph for illustrating the manner of operation of the control system of FIG. 5.

FIG. 7 shows the case of control system behavior when the desired value $\alpha_s$ lies behind the optimum desired value. FIG. 7, like FIG. 6, is in four parts, a part (a) showing the error signals $\alpha_r$, a part (b) showing the measured values of work A and a part (d) showing the output signal K of the multiplier 5. The average value of the output signal K is negative, which leads to a diminution of the desired value $\alpha_s$ by the integrating behavior of the desired value controller 6.

In summary, it may be said that the behavior of the control system illustrated in FIGS. 6 and 7 shows that a desired value $\alpha_s$ is automatically set at which the work A developed by the internal combustion engine is at a maximum. When that is established, the error signal $\alpha_r$ and the measured value of the work A which appear are also correlated and, at the output of the multiplier 5, there is a pulse sequence of signals K having a zero average value, so that the desired ignition angle value $\alpha_s$ remains stable. An outstanding feature of this control of the ignition timing of an internal combustion engine in accordance with the present invention is its dynamic behavior. Rapid changes in load are coped with by the rapid control of the ignition angle with respect to a predetermined location of the pressure maximum by the rapid control provided by the actual value computing stage 2 and the ignition controller 3. By its capability for slow alteration of the desired value, the control system provides an optimal ignition angle independently of those operating of the parameters of the engine subject to slow persistent changes such, as, for example, temperature changes.

Although the invention has been described with respect to a particular illustrative example, it will be understood that variations and modifications are possible within the inventive concept. For example, the pressure may be measured in all of the cylinders of the engine and correlated with the respectively correct relative crankshaft angles, or it may be measured in only a few cylinders out of many, or in only one.

I claim:

1. Method of optimizing the control of the ignition timing of an internal combustion engine comprising the steps of:
    selecting a measurable optimization parameter (A) for said engine;
    selecting a measurable operating parameter ($\alpha_{p,max}$) related to said optimization parameter and to said controllable parameter and derivable in a manner utilizing at least one sensor for detecting the behavior of said machine;
    computing said measurable operating parameter ($\alpha_{p,max}$) for each ignition cycle of said engine and comparing it with a correctable reference value thereof to produce an error signal ($\alpha_p$);
    detecting behavior of said engine by means of said sensor and computing the value of said optimization parameter (A) with use of the output of said sensor for each ignition cycle of said engine;
    multiplying the computed value of said optimization parameter (A) by the value of said error signal ($\alpha_r$) to produce a correlation signal (K);
    producing said correctable reference value by the output of an integrating controller (6) supplied with said correlation signal (K) for its input;
    correcting said reference value between successive ignition cycles of said engine by means of said integrating controller (6) by shifting the magnitude of said reference signal at the output of said controller in the direction having the great probability of change towards zero by producing in said integrated controller (6) a signal representative of the average of said correlation signal (K) and previous values of said correlation signal produced in previous ignition cycles of said engine, and
    controlling said controllable operating parameter ($\alpha_z$) by the output of a controller supplied with said error signal ($\alpha_r$) for its input.

2. Method according to to claim 1, in which the extent of shift of said reference value produced at the output of said integrating controller (6) is caused to be proportional to the absolute value of the last computed average value of said correlation factor (K) and previous values thereof produced in previous ignition cycles of said engine.

3. Apparatus for optimizing the control of the ignition timing of an internal combustion engine comprising:
    an ignition timing circuit for controlling the instant of ignition of said engine in response to an error signal, the magnitude and sign of which represent respectively the extent and direction of ignition timing shift to be produced;
    means incorporated in said engine producing signals indicative of crankshaft rotary angle;
    means incorporated in said engine for producing a signal representative of combustion chamber pressure in at least one cylinder of said engine;
    means responsive to said signals representative of crankshaft rotary angle and of combustion chamber pressure for producing at its output a report signal representative of the crankshaft rotary angle at which said combustion chamber pressure is at a maximum;
    means for comparing said report signal with a reference signal to produce an error signal supplied as an input to said ignition timing control means and further comprising,
    means responsive to said crankshaft rotary angle signal and said combustion chamber pressure signal for computing the work performed in each cycle within a predetermined range of crankshaft rotary angle in the combustion chamber of said at least one cylinder of said internal combustion engine and for providing an output therefrom for use as a reference value crankshaft angle for comparison with said value of crankshaft angle at which combustion chamber pressure is at a maximum for producing said error signal.

4. Apparatus according to claim 3, in which said pressure is measured in each cylinder of said engine and in which said means for deriving said reference value in response to said crankshaft angle signal and said combustion chamber pressure signal includes a multiplier for multiplying the computed work performed in each cylinder by said error signal before the completion of derivation of said reference value.

5. Apparatus according to claim 4, in which said means for producing said referrence value includes a reference value controller (6) having its input connected to the output of said multiplier and its output connected to the reference value input of said means for producing said error signal.

6. Apparatus according to claim 5, in which said reference value controller (6) is an integrating controller.

* * * * *